United States Patent
Elliott et al.

(10) Patent No.: US 7,021,898 B2
(45) Date of Patent: Apr. 4, 2006

(54) DAMPER SEAL

(75) Inventors: Robert Elliott, Derby (GB); Ian Tibbott, Lichfield (GB)

(73) Assignee: Rolls-Royce PLC, London (GB)

( * ) Notice: Subject to any disclaimer, the term of this patent is extended or adjusted under 35 U.S.C. 154(b) by 73 days.

(21) Appl. No.: 10/780,582

(22) Filed: Feb. 19, 2004

(65) Prior Publication Data

US 2004/0165983 A1 Aug. 26, 2004

(30) Foreign Application Priority Data

Feb. 26, 2003 (GB) .................................. 0304329

(51) Int. Cl.
*F01D 5/22* (2006.01)
(52) U.S. Cl. ................... 416/193 A; 416/500; 415/119
(58) Field of Classification Search .............. 416/97 R, 416/193 A, 500; 415/119, 134
See application file for complete search history.

(56) References Cited

U.S. PATENT DOCUMENTS

| | | | | |
|---|---|---|---|---|
| 2,656,147 A | * | 10/1953 | Brownhill et al. | ........ 416/97 R |
| 4,767,260 A | * | 8/1988 | Clevenger et al. | .......... 415/115 |
| 4,872,812 A | * | 10/1989 | Hendley et al. | ............. 416/190 |
| 5,156,528 A | * | 10/1992 | Bobo | ......................... 416/190 |
| 5,531,457 A | * | 7/1996 | Tibbott et al. | ............... 277/590 |

FOREIGN PATENT DOCUMENTS

EP 0 509 838 A1 10/1992

* cited by examiner

*Primary Examiner*—Edward K. Look
*Assistant Examiner*—Devin Hanan
(74) *Attorney, Agent, or Firm*—Oliff & Berridge, PLC

(57) ABSTRACT

A damper seal 7, 21, 31 is provided in order to act within a mounting platform structure 3 for turbine blades 1, 2. The damper seal 7, 21, 31 includes an entrant surface 8, 28, 38 incorporating a number of paths 22, 32 to enable coolant flow across the entrant surface 8, 28, 38. The damper seal 7, 21, 31 acts to plug an aperture 9 in the structure 3 between adjacent blades 1, 2 and damper detrimental vibrations in the structure 3 which could damage the blades 1, 2. Thus, whilst contact portions 23, 33 are in vibrational coupling contact with the aperture 9, coolant airflow through the paths 22, 32 enables cooling of the seal 7, 21, 31 and areas of the structure 3 about the aperture 9.

19 Claims, 4 Drawing Sheets

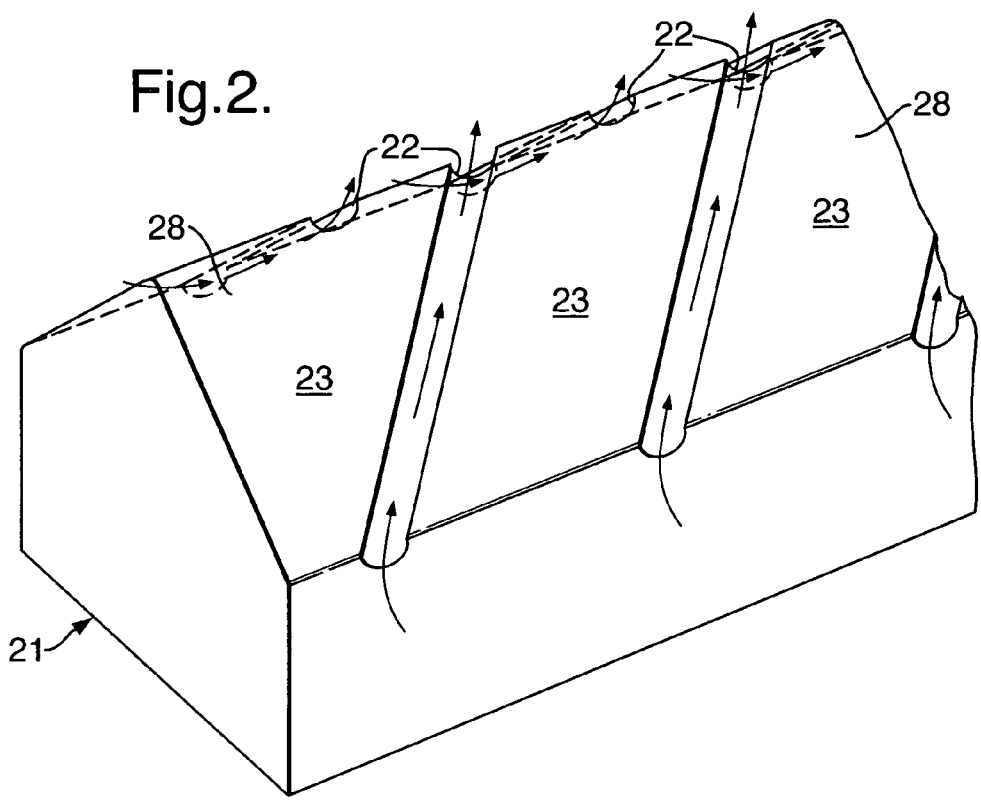
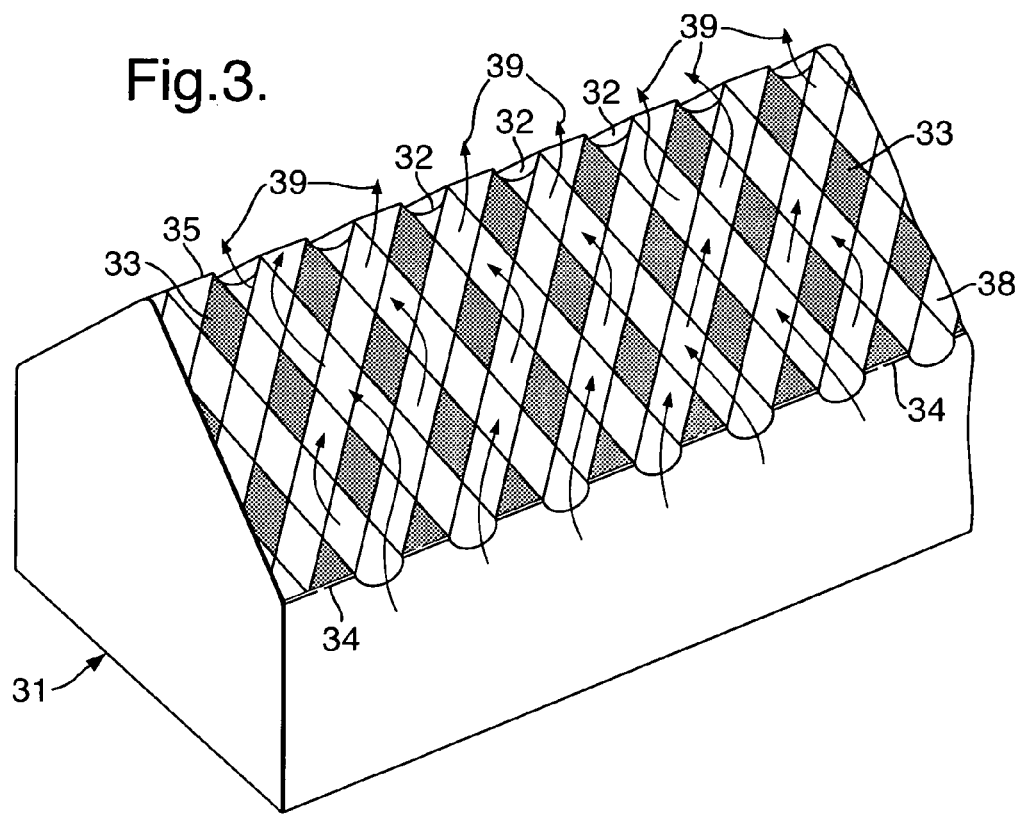

DAMPER SEAL

The present invention relates to damper seals and more particularly to vibration damper seals used between platform sections upon which turbine blades or aerofoils of turbo machines such as jet engines or steam turbines are secured.

In order to dampen or eliminate potentially detrimental vibrations within a jet engine, it is normal to provide a damper between mounting sections for each turbine blade or aerofoil. Within a jet engine high temperatures are present, and it is generally necessary to cool components in order to retain sufficient mechanical strength for performance. In fact, it is not unusual within certain sections of a jet engine for the operational temperature to be higher than that of the materials from which that part of the engine is formed so that cooling is essential. High temperatures are required to achieve high thermal efficiencies and therefore greater engine performance.

Regrettably, the intimate contact necessary for a vibration damper seal to achieve its objective of reducing or eliminating detrimental vibration of frequencies makes it difficult to cool such seals. In such circumstances, damper seals can be considered "hot spots" which inhibit further temperature improvements and therefore engine efficiency developments.

In accordance with the present invention there is provided a damper seal for vibration reduction, the seal comprising an entrant surface for close association with an aperture in a mounting platform for components, the entrant surface having contact portions to engage the aperture to allow vibration or coupling therebetween and recessed paths to allow coolant flow about those contact portions across the entrant surface towards the aperture, said paths being both angled and staggered relative to one another.

Preferably, the paths are channels or grooves formed in the entrant surface. Typically, the paths or grooves have an elliptical cross-section or are otherwise shaped to facilitate heat exchange with a coolant flow passing along the path. Possibly, the paths meander or cross with respect to each other and across the entrant surface. Normally, the paths when the entrant surface is associated with the aperture provides a conduit open at both ends through which coolant flow crosses the entrant surface.

Preferably, the contact portions comprise pedestals or mesas which define contact portions for intimate engagement with the aperture in order to provide vibrational coupling therebetween.

Generally, the entrant surface is shaped for conformity in association with the aperture. Typically, the entrant surface has a sloped ridge cross-section. Typically, the damping seal will effectively plug in use the aperture whilst allowing coolant flow through the recessed paths across the entrant surface.

Possibly, the damping seal as a whole or the contact portions and/or the recessed paths are configured to allow variation in cross-sectional area with temperature in order to vary the rate of coolant flow allowable across the entrant surface. Possibly, the contact portions may be formed from a thermally expandable material which displaces or stands off the damper seal at elevated temperatures to increase the cross-sectional area of the recessed paths thereabout.

Also in accordance with the present invention there is provided a damper for a seal arrangement comprising a damper seal as described above secured within an aperture of a mounting platform structure for turbine blades, the platform structure including a coolant cavity and the damping seal coupled to that cavity to enable coolant to flow across the entrant surface.

Further in accordance with the present invention there is provided a turbine engine incorporating a damper seal or a damper seal arrangement as described above.

Embodiments of the present invention will now be described by way of example only with reference to the accompanying drawings in which;

FIG. 2 is a front perspective view of a damper seal in accordance with a first embodiment of the present invention;

FIG. 3 is a front perspective of a second embodiment of the present invention;

Figure 1:
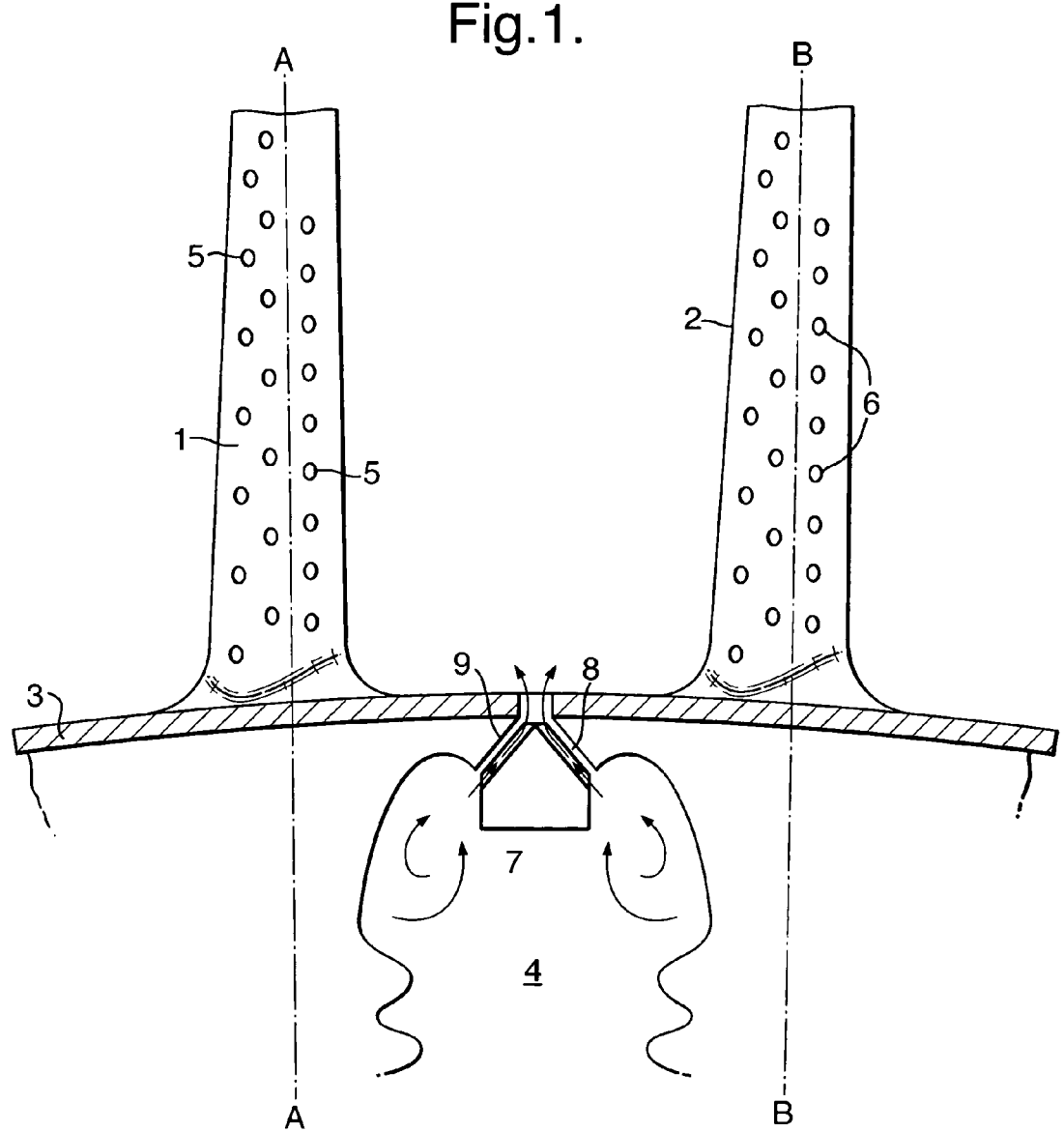
FIG. 1 is a schematic part cross-section of a damper seal arrangement in accordance with the present invention.

Referring to FIG. 1 illustrating a schematic cross-section of a damper sealing arrangement in accordance with the present invention. The sealing arrangement shows two aerofoils or turbine blades 1, 2 which are secured to a mounting platform structure 3 in order to present the blades 1, 2 appropriately. It will be understood that the blades 1, 2 in normal operation are secured about a rotor disk such that the blades 1, 2 are angled relative to each other. In such circumstances, the longitudinal axis A-A, B-B of respective blades 1, 2 are angled relative to each other as can be seen. As can also be seen, the blades 1, 2 are mounted within the platform structure 3 such that a cavity 4 within the structure 3 acts as a coolant gallery to supply coolant air through a network (not shown) to apertures 5, 6 in the respective blades 1, 2. This coolant air passes through the apertures 5, 6 to provide surface cooling for the blades 1, 2.

As described previously, the blades 1, 2 in operation rotate and such rotation along with other loads placed upon the respective blades 1, 2 creates vibration. Particular frequencies and vibration may be detrimental to the blade 1, 2 and so a vibration damper seal 7 is generally provided to enhance friction damping between respective blades 1, 2 in the mounting platform structure 3. In order to provide said damping the damper 7 must be in vibrational contact with the platform structure 3. Thus, an entrant surface 8 of the seal 7 is placed in contact with an aperture 9 between the respective blades 1, 2 in the platform structure 3. The damper seal 7 essentially plugs the aperture 9.

With previous damper seals, there is face to face flat abutment between the entrant surface and the surfaces of the aperture. Thus, coolant flows as shown by arrowheads could not pass across the entrant surface in order to cool the damper seal as well as the intermediate parts of the platform structure 3 between the blades. In such circumstances, overheating occurs despite the relatively large volume of coolant air located within the cavity. Such overheating can create oxidation and cracking in the mounting platform structure as well as with respect to the previous damper seal and root or mounting parts of the respective blades.

In accordance with the present invention the entrant surface 8 incorporates paths in order to allow coolant air flows shown by the arrowheads to pass across that entrant surface 8 in order to cool both the damper seal 7 and the parts of the mounting platform structure 3 adjacent the aperture 9. These paths are arranged either side of contact portions of the entrant surface 8 which are in direct contact with the aperture 9. Thus, there is vibrational coupling to allow the damper seal 7 to perform its principal function of eliminating or at least inhibiting detrimental vibration propagation about the mounting platform structure 3 and between the blades 1, 2.

FIGS. 2 and 3 illustrate two embodiments of a damper seal in accordance with the present invention. Both these embodiments incorporate an entrant surface which is generally of a sloped ridge nature reminiscent of a cottage roof. However, it is appropriate association within the aperture of a platform structure which is the principal requirement. Thus, if that aperture has a concave or convex or dendritic/firtree cross-section then the engagement surface will be similarly shaped in order to be associated with the aperture such that there can be vibrational coupling to the damper and therefore inhibition of vibration propagation between blades.

FIG. 2 illustrates a front perspective of a first damper seal 21 in accordance with the present invention. The damper seal 21 incorporates an entrant surface 28, which takes the form of a ridged slope of a roof-like cross-section. Within the entrant surface 28 recessed paths 22 are provided through which coolant airflow passes in order to cool the damper seal 21 and in use an aperture with which the entrant surface 28 is associated. Between the paths 22 there are contact portions 23 of the entrant surface 28. In use, these contact portions 23 are normally in abutting contact with surfaces of the aperture in the platform structure in order to provide a vibrational coupling therebetween. Thus, vibration is coupled to the damper 21 in order to inhibit vibration propagation as described previously.

The paths 22 normally have an elliptical cross-section as depicted in FIG. 2 in order to provide good coolant flow to surface contact for heat exchange. Similarly, the paths 22 are angled in order to create a longer path length across the entrant surface 23 for greater heat exchange between the coolant airflow and the surfaces of each path 22. As can be seen, normally the paths 22 are regularly distributed in a staggered configuration and are all similarly shaped. However, where necessary or desirable a greater concentration of paths can be provided at certain positions upon the entrant surface and these paths may be of different dimensions in order to create different coolant airflow effects. It will also be understood that the paths could be bowed or otherwise shaped.

FIG. 3 illustrates a second embodiment of a damper seal 31 in accordance with the present invention. The damper seal 31 again has a plurality of recessed paths 32 through which coolant airflow shown by arrowheads 39 passes. These paths 32 are in a diamond or crisscrossed shaped configuration such that they pass either side of contact portions 33 which in use are in vibrational coupling contact with an aperture of a mounting platform structure (not shown). The contact portions 33 act as pedestal supports such that the paths 32 are offset from the aperture surface in the platform structure (not shown). In such circumstances, there is in use essentially a closed conduit through which the coolant airflow 39 can pass which extends from a bottom edge of the entrant surface 34 to a top ridge 35. In such circumstances, the entrant surface 38 is effectively cooled by the coolant airflow through the paths 32 and there is similar cooling of the aperture and therefore the platform structure about that aperture.

A distinction between the second embodiment of the present invention and the first embodiment depicted in FIG. 2 is that rather than cause a direct path across the entrant surface 28 (FIG. 2) the paths 32 in the second embodiment allow the coolant airflow to meander and divide through the diamond or cross hatch arrangement of paths 32 from one side of the entrant surface 38 to the other. In such circumstances, there may be a greater degree of cooling effect. However, it will be noted that the contact portions 33 through which vibrational coupling is achieved in order to cause damping is significantly reduced per unit area and therefore the primary function of the damper seal may be affected.

Clearly, a damper seal in accordance with the present invention will be made from a material through which vibration can at least be transmitted to a damping mechanism or that seal itself provide vibrational damping as required. Nevertheless, the damper seal can be a composite of a number of materials in order to achieve its performance. The entrant surface may be a layer applied to a base formation for a damper seal to enable the paths in accordance with the present invention to be moulded or etched or more easily cut into that attached layer rather than the base formation. In such circumstances, an existing damper seal may be adapted to a damper seal in accordance with the present invention. Furthermore, the attached layer may be designed such that through a differential expansion the damper seal is further offset from its associated aperture in the platform structure with increasing temperature such that the available cross-sectional area of the paths across the entrant surface increased to allow greater coolant flow as well as provide an increased contact surface for heat exchange. It will also be understood that the attached layer may have a shaped memory function such that at lower temperatures the direct paths 22 depicted in FIG. 2 are available but at higher temperatures through such expansion of the attached layer shaped memory cross channels become available in accordance with the second embodiment of the invention depicted in FIG. 3.

Aperture slots are provided from the paths at the top edge of the entrant surface. These slots are generally angled in order to present the emerging coolant gas at a favourable angle to provide a degree of film surface cooling about the platform structure. It will be understood that emerging coolant air will be impinged by gas streams about the blades or aerofoils which creates significant turbulence and can break up the coolant airflow. By appropriate emerging angle through each slot aperture premature dispersal of the coolant airflow can be reduced.

Figure 4:
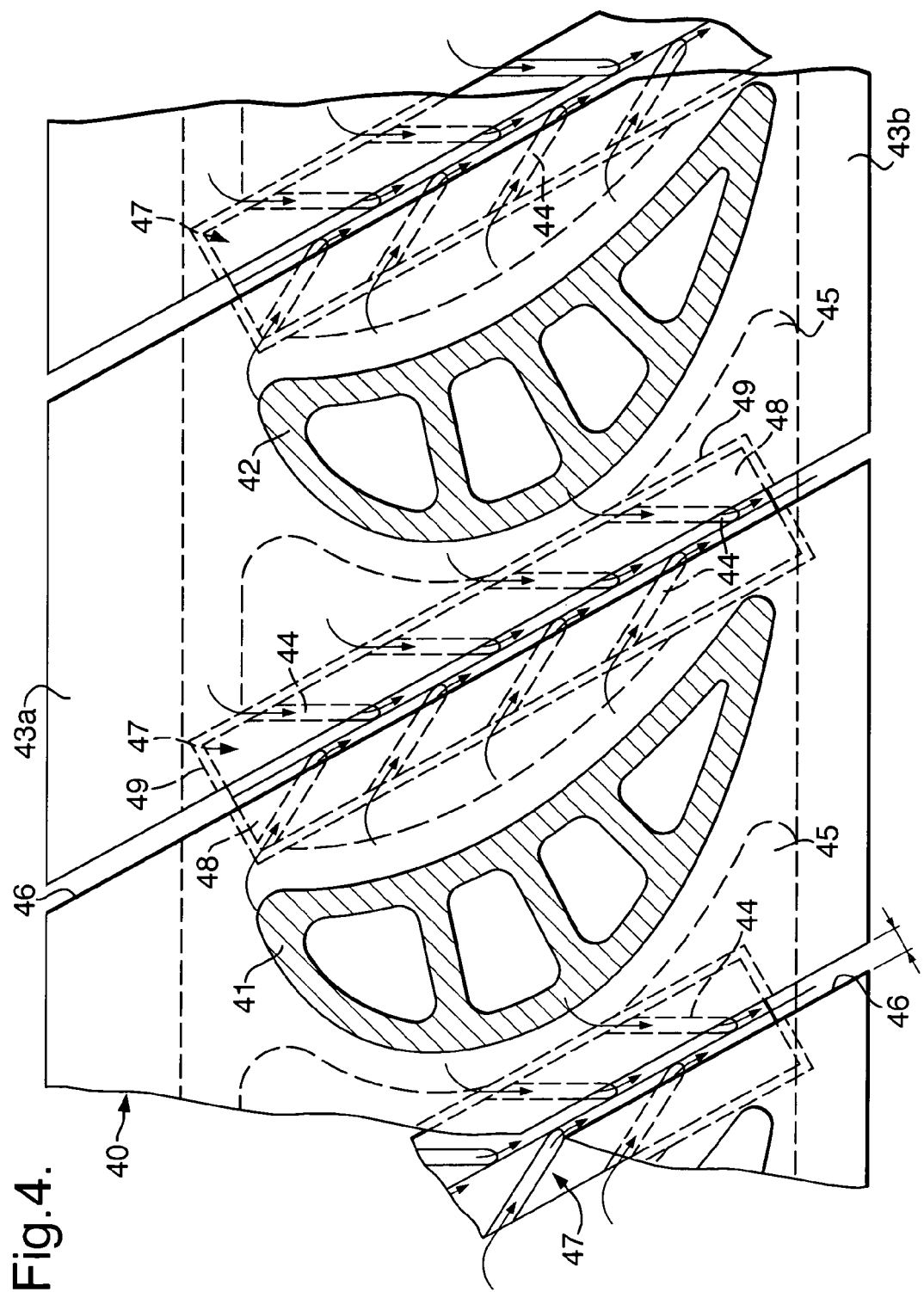
FIG. 4 is a schematic part plan view of a damper arrangement with a damper seal in accordance with FIG. 2; and, FIG. 5 is a front perspective of a third embodiment of the present invention.

FIG. 4 illustrates a schematic part plan view of a damper seal arrangement in accordance with the present invention. Thus, the arrangement 40 includes blades 41, 42 secured to a mounting platform structure 43 with a damper seal 47 secured between those blades 41, 42 to provide vibrational damping as described previously. The damper seal 47 presents an entrant surface 48 to an aperture in the platform structure 43 with paths 44 arranged to allow coolant airflow in the direction of the arrowheads across the entrant surface in order to cool that seal and adjacent parts of the platform structure 43. The coolant air emanates from a coolant pocket or gallery 45 below the seal 47. Having passed through the paths 44 the coolant air exits through an inter-platform gap 46 between platform segments which form the structure 43. Thus, the coolant airflow in the direction of arrowheads is presented at an appropriate inclination above the platform structure 3 whereby premature dispersion and dilution of the coolant airflow is inhibited in order to extenuate the effectiveness of film cooling of the structure 43 between the blades 41, 42. Generally, the platform structure 43a is upstream whilst platform structure 43b is downstream as that structure 43 is rotated in an engine. Thus, turbine airflow is in a similar direction to that of the coolant airflow through the paths 44 within the entrant surface 48 of the seal 47.

As described previously, normally the entrant surface 48 has a sloped ridge or roof-like cross-section to enable appropriate association within an aperture 49 of the platform structure 43. Furthermore, the damper 47 through engagement between the entrant surface 48 and the aperture 49 will essentially plug that aperture whereby there is vibrational coupling to the damper 47 whilst cooling is provided through the paths 44.

Figure 5:
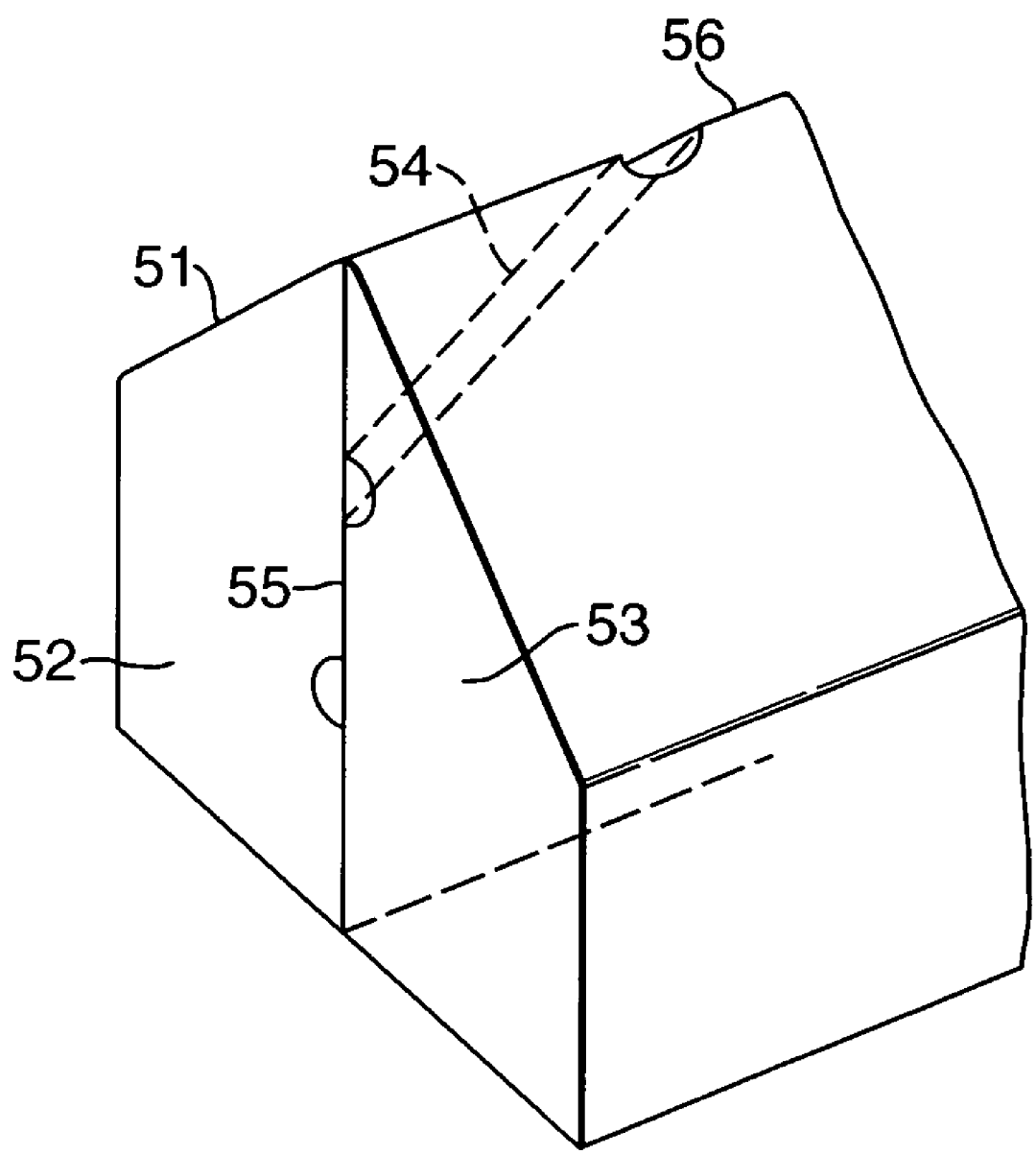

FIG. 5 illustrates a third embodiment of the present invention as a schematic front perspective. A damper seal 51 is formed from respective seal elements 52, 53 in a close association as depicted. Cooling channels 54 are provided by grooves respectively formed in vertical surfaces 55 of each seal element 52, 53. These cooling channels 55 extend from an apex 56 downward through the junction between the elements 52, 53 at the vertical surfaces 55. Thus, there is further enhanced cooling provided by the damper seal 51. As depicted, the cooling channels are formed by grooves in the respective vertical surfaces 55 and preferably provided by alternating grooves in opposed seal elements 52, 53. Generally, other recessed paths will still be provided in addition to the coolant channel 54. These recess paths will be as described previously.

It will be appreciated that alternative embodiments of the present invention could be envisaged. For example, the diamond shape pedestal contact portions depicted in FIG. 2 could be round or semi-circular or shaped in order to create further coolant airflow turbulence and therefore heat exchange to provide cooling of the damper seal.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A damper seal for vibration control, the seal comprising an entrant surface for close association with an aperture in a mounting platform for components, the entrant surface having contact portions to engage the aperture to allow vibrational coupling therebetween and recessed paths to allow coolant flow about those contact portions across the entrant surface, the paths being both angled and staggered relative to one another, the paths being formed by direct channels or grooves that extend across the entrant surface.

2. A seal as claimed in claim 1 wherein the paths are cross hatched across the entrant surface in order to cause turbulence within the coolant flow.

3. A seal as claimed in claim 1 wherein the paths have an elliptical cross-section.

4. A seal as claimed in claim 1 wherein the contact portions are configured to facilitate coolant flow across the entrant surface through the paths.

5. A seal as claimed in claim 1 wherein the entrant surface has a sloped ridge configuration.

6. A seal as claimed in claim 1 wherein the entrant surface is configured for association with the aperture in order to substantially plug that aperture.

7. A seal as claimed in claim 1 wherein the entrant surface is designed through differential thermal expansion to present the paths with variable available cross-section for coolant flow.

8. A damper seal as claimed in claim 1 wherein the seal is formed from seal elements held in close association with respective surfaces in abutment to form the seal.

9. A seal as claimed in claim 8 wherein the respective surfaces are vertical and include grooves in one or both to define further recessed paths for coolant flow.

10. A damper seal arrangement comprising a damper seal as claimed in claim 1 secured within an aperture of a mounting platform structure for turbine blades or aerofoils, the platform structure including a coolant cavity and the damper seal coupled to that cavity to enable coolant to flow across the entrant surface.

11. A turbine engine including a damper seal as claimed in claim 1.

12. A seal as claimed in claim 4 wherein the contact portions have a diamond shape.

13. A seal as claimed in claim 4 wherein the contact portions have a circular shape.

14. A damper seal for vibration control, the seal comprising an entrant surface for close association with an aperture in a mounting platform for components, the entrant surface having contact portions to engage the aperture to allow vibrational coupling therebetween and recessed paths to allow coolant flow about those contact portions across the entrant surface, the paths being both angled and staggered relative to one another, the paths being cross hatched across the entrant surface in order to cause turbulence within the coolant flow.

15. A damper seal arrangement comprising a damper seal as claimed in claim 14 secured within an aperture of a mounting platform structure for turbine blades or aerofoils, the platform structure including a coolant cavity and the damper seal coupled to that cavity to enable coolant to flow across the entrant surface.

16. A turbine engine including a damper seal as claimed in claim 14.

17. A damper seal for vibration control, the seal comprising an entrant surface for close association with an aperture in a mounting platform for components, the entrant surface having contact portions to engage the aperture to allow vibrational coupling therebetween and recessed paths to allow coolant flow about those contact portions across the entrant surface, the paths being both angled and staggered relative to one another, the seal being formed from seal elements held in close association with respective surfaces in abutment to form the seal, the respective surfaces being vertical and include grooves in one or both to define further recessed paths for coolant flow.

18. A damper seal arrangement comprising a damper seal as claimed in claim 17 secured within an aperture of a mounting platform structure for turbine blades or aerofoils, the platform structure including a coolant cavity and the damper seal coupled to that cavity to enable coolant to flow across the entrant surface.

19. A turbine engine including a damper seal as claimed in claim 17.

* * * * *